(12) United States Patent
Kim et al.

(10) Patent No.: US 7,709,152 B2
(45) Date of Patent: May 4, 2010

(54) ORGANIC/INORGANIC COMPOSITE SEPARATOR HAVING POROUS ACTIVE COATING LAYER AND ELECTROCHEMICAL DEVICE CONTAINING THE SAME

(75) Inventors: Seok-Koo Kim, Daejeon (KR); Joon-Yong Sohn, Busan (KR); Jong-Hyeok Park, Daejeon (KR); Hyun-Min Jang, Daejeon (KR); Byoung-Jin Shin, Busan (KR); Sang-Young Lee, Daejeon (KR); Jang-Hyuk Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/158,934

(22) PCT Filed: Feb. 5, 2008

(86) PCT No.: PCT/KR2008/000706

§ 371 (c)(1),
(2), (4) Date: Jun. 23, 2008

(87) PCT Pub. No.: WO2008/097013

PCT Pub. Date: Aug. 14, 2008

(65) Prior Publication Data

US 2009/0111026 A1     Apr. 30, 2009

(30) Foreign Application Priority Data

Feb. 5, 2007    (KR) ............... 10-2007-0011818

(51) Int. Cl.
*H01M 2/16*    (2006.01)
*H01M 4/58*    (2006.01)

(52) U.S. Cl. ............... 429/251; 429/247; 429/249; 429/231.95

(58) Field of Classification Search ............... 429/251, 429/249, 247

See application file for complete search history.

(56) References Cited

U.S. PATENT DOCUMENTS

| 6,328,770 | B1 | 12/2001 | Gozdz |
| 6,492,295 | B2 * | 12/2002 | Hitomi et al. ............... 502/159 |
| 6,746,803 | B1 | 6/2004 | Bauer et al. |
| 6,821,680 | B2 | 11/2004 | Tanaka et al. |
| 6,878,484 | B2 * | 4/2005 | Tanaka et al. ............... 429/145 |
| 2002/0187401 | A1 * | 12/2002 | Lee et al. .................... 429/303 |

FOREIGN PATENT DOCUMENTS

| KR | 10-2006-0003665 A | 1/2006 |
| KR | 10-2006-0072065 A | 6/2006 |
| KR | 10-2007-0000231 A | 1/2007 |

* cited by examiner

*Primary Examiner*—Patrick Ryan
*Assistant Examiner*—Julian Mercado
(74) *Attorney, Agent, or Firm*—Birch, Stewart, Kolasch & Birch, LLP

(57) ABSTRACT

An organic/inorganic composite separator includes (a) a polyolefin porous substrate having pores; and (b) a porous active layer containing a mixture of inorganic particles and a binder polymer, with which at least one surface of the polyolefin porous substrate is coated, wherein the porous active layer has a peeling force of 5 gf/cm or above, and a thermal shrinkage of the separator after being left alone at 150° C. for 1 hour is 50% or below in a machine direction (MD) or in a transverse direction (TD). This organic/inorganic composite separator solves the problem that inorganic particles in the porous active layer formed on the porous substrate are extracted during an assembly process of an electrochemical device, and also it may prevent an electric short circuit between cathode and anode even when the electrochemical device is overheated.

20 Claims, 2 Drawing Sheets

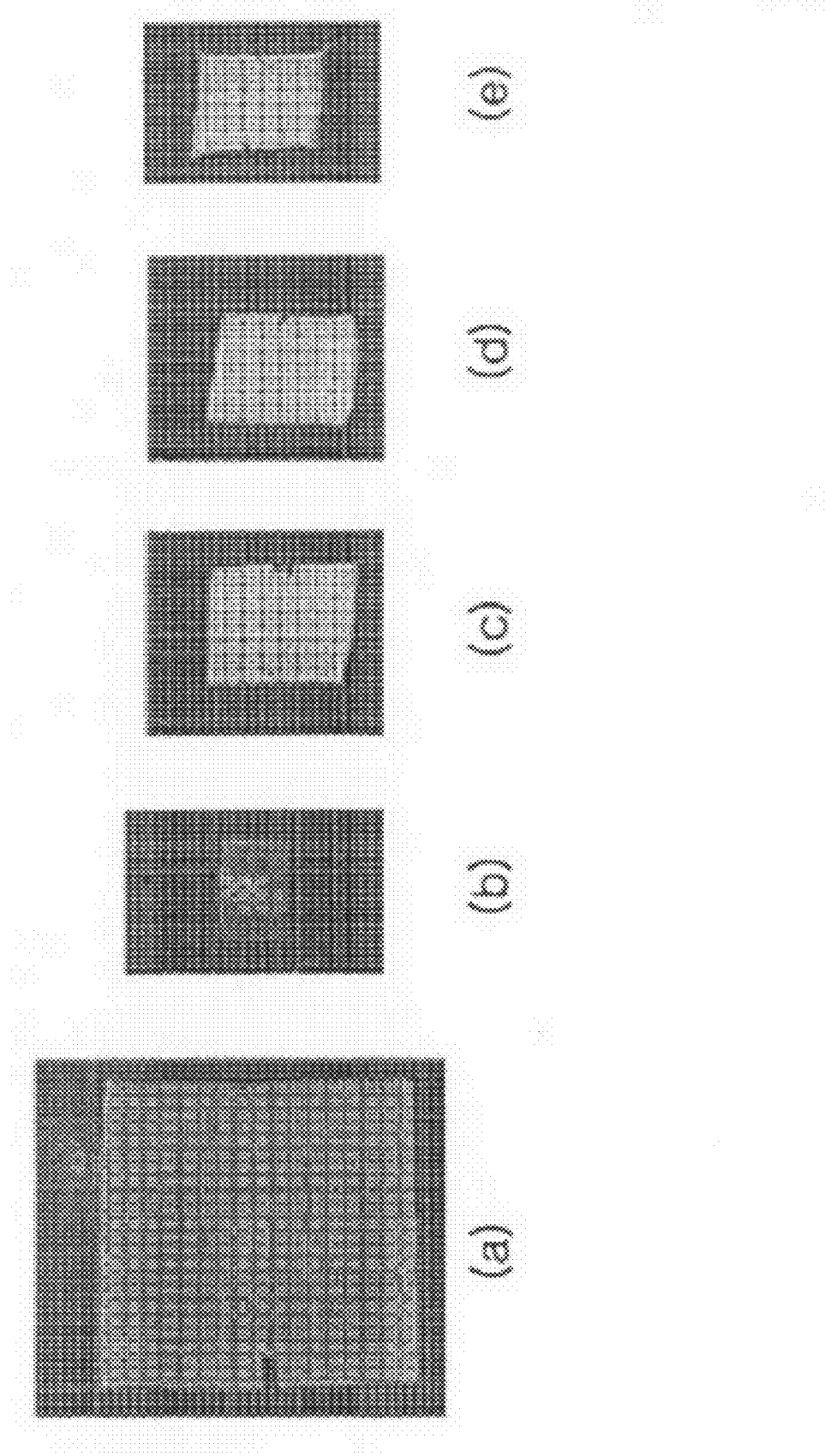
[Fig. 1]

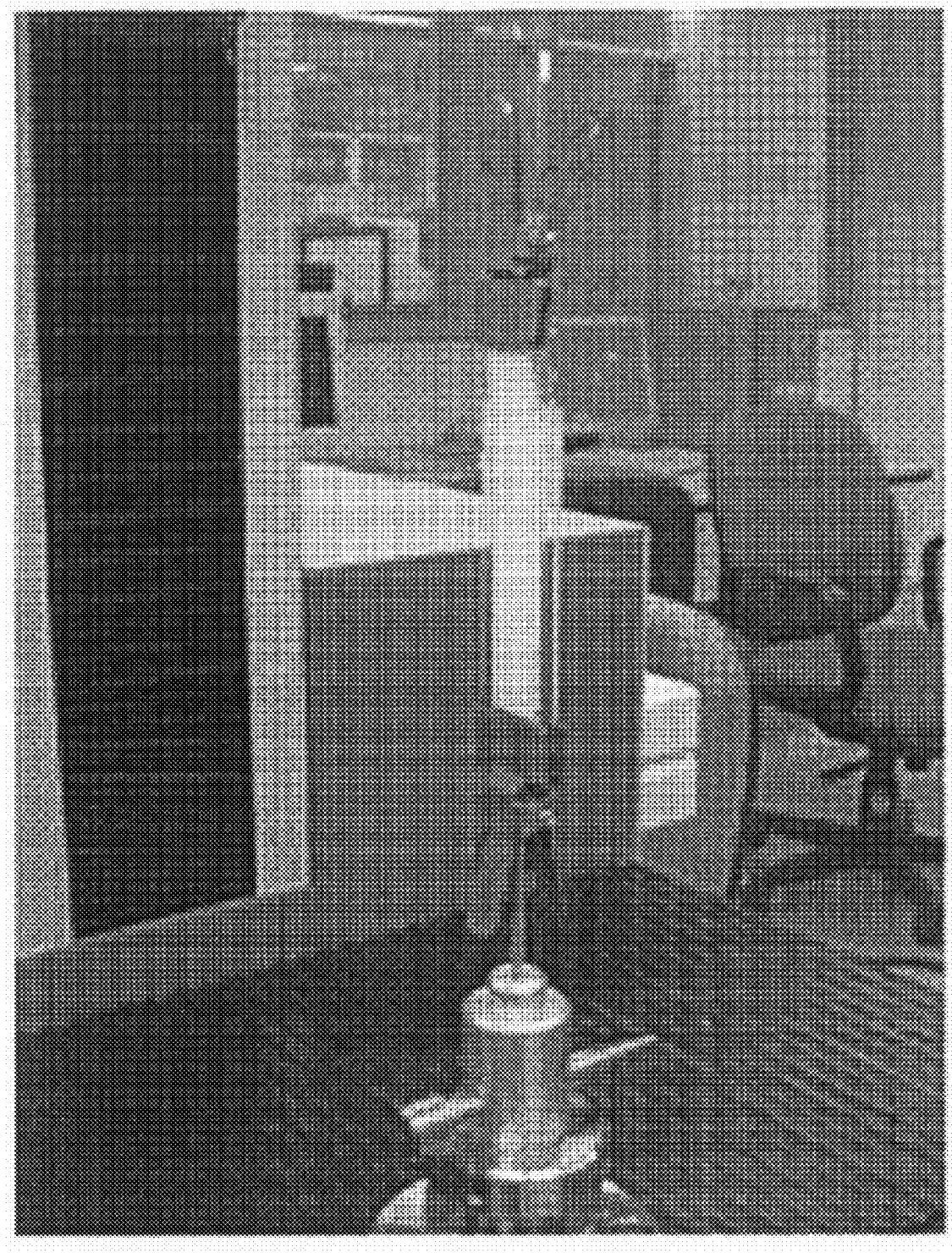
[Fig. 2]

ORGANIC/INORGANIC COMPOSITE SEPARATOR HAVING POROUS ACTIVE COATING LAYER AND ELECTROCHEMICAL DEVICE CONTAINING THE SAME

TECHNICAL FIELD

The present invention relates to a separator of an electrochemical device such as a lithium secondary battery and an electrochemical device containing the same. More particularly, the present invention relates to an organic/inorganic composite separator in which a porous active layer is coated with a mixture of an inorganic particle and a polymer onto a surface of a porous substrate, and an electrochemical device containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, the research and development into a novel electrode and a novel battery that can improve capacity density and specific energy have been made intensively in the field of the secondary batteries.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity than those of the lithium ion batteries and an insufficient discharging capacity in low temperature, and therefore these disadvantages of the lithium-ion polymer batteries remain to be urgently solved.

Such electrochemical devices have been produced from many companies, and the battery stability has different phases in the electrochemical devices. Accordingly, it is important to evaluate and ensure the stability of the electrochemical batteries. First of all, it should be considered that errors in operation of the electrochemical device should not cause damage to users. For this purpose, the Safety Regulation strictly regulates ignition and explosion in the electrochemical devices. In the stability characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100° C. or above due to the features of its material and its manufacturing process such as elongation, so there may occur an electric short circuit between cathode and anode.

In order to solve the above safety-related problems of the electrochemical device, there has been proposed an organic/inorganic composite separator having a porous active layer formed by coating at least one surface of a polyolefin porous substrate having many pores with a mixture of inorganic particles and a binder polymer (see Korean Laid-open Patent Publication No. 10-2006-72065 and 10-2007-231, for example). The inorganic particles in the porous active layer formed on the polyolefin porous substrate act as a kind of spacer that keeps a physical shape of the porous active layer, so the inorganic particles restrain thermal shrinkage of the polyolefin porous substrate when the electrochemical device is overheated. In addition, interstitial volumes exist among the inorganic particles, thereby forming fine pores.

As mentioned above, at least a certain amount of inorganic particles should be contained such that the porous active layer formed on the organic/inorganic composite separator may restrain thermal shrinkage of the polyolefin porous substrate. However, as the content of inorganic particles is increased, a content of binder polymer is relatively decreased, which may cause the following problems.

First, due to the stress generated in an assembly process of an electrochemical device such as winding, inorganic particles may be extracted from the porous active layer, and the extracted inorganic particles act as a local defect of the electrochemical device, thereby giving a bad influence on the stability of the electrochemical device.

Second, an adhesion between the porous active layer and the polyolefin porous substrate is weakened, so the ability of the porous active layer to restrain thermal shrinkage of the polyolefin porous substrate is deteriorated. Thus, it is difficult to prevent an electric short circuit between cathode and anode even when the electrochemical device is overheated.

On the contrary, if the content of binder polymer in the porous active layer is increased in order to prevent extraction of inorganic particles, the content of inorganic particles is relatively decreased, so thermal shrinkage of the polyolefin porous substrate may not be easily restrained. Accordingly, it is hard to prevent an electric short circuit between cathode and anode, and also the performance of the electrochemical device is deteriorated due to the decrease of porosity in the porous active layer.

DISCLOSURE OF INVENTION

Technical Problem

The present invention is designed to solve the problems of the prior art, and therefore an object of the invention is to provide an organic/inorganic composite separator capable of preventing extraction of inorganic particles in a porous active layer formed on a porous substrate during an assembly process of an electrochemical device, and also capable of restraining an electric short circuit between cathode and anode even when the electrochemical device is overheated.

Technical Solution

In order to accomplish the first object, the present invention provides an organic/inorganic composite separator, which includes (a) a polyolefin porous substrate having pores; and (b) a porous active layer containing a mixture of inorganic particles and a binder polymer, with which at least one surface of the polyolefin porous substrate is coated, wherein the porous active layer has a peeling force of 5 gf/cm or above, and a thermal shrinkage of the separator after being left alone at 150° C. for 1 hour is 50% or below in a machine direction (MD) or in a transverse direction (TD).

The organic/inorganic composite separator of the present invention may solve the problem that inorganic particles in the porous active layer are extracted during an assembly process of an electrochemical device, though inorganic particles are sufficiently contained over certain content. In addition, an adhesive force between the porous active layer and the polyolefin porous substrate is strong, so thermal shrinkage is restrained to some extent though the electrochemical device is overheated, thereby preventing an electric short circuit between the cathode and the anode. Accordingly, the stability of the electrochemical device is greatly improved.

In the organic/inorganic composite separator according to the present invention, the binder polymer is preferably a mixture of a first binder polymer having a contact angle to a water drop of 70° to 140° and a second binder polymer having a contact angle to a water drop of 1° to 69°. Since the first and second binder polymers with different hydrophile properties are used in a blend form to control the hydrophile property of the polymer blend, there may be obtained a synergistic effect in improvement of thermal stability of the organic/inorganic composite separator.

The first binder mentioned above may be any one polymer or a mixture of at least two polymers selected from the group consisting of polyvinylidene fluoride, polyvinylidene fluoride-co-hexafluoropropylene, polyvinylidene fluoride-co-trichloroethylene, polymethylmethacrylate, polyacrylonitrile, polyvinylacetate, polyethylene-co-vinyl acetate, polyimide and polyethylene oxide.

Also, the second binder polymer mentioned above may be any one polymer or a mixture of at least two polymers having at least one polar group selected from the group consisting of hydroxyl group (—OH), carboxyl group (—COOH), maleic anhydride group (—COOOC—), sulphonate group (—$SO_3H$) and pyrrolidone group (—NCO—). These second binder polymer may be cyanoethylpullulan, cyanoethylpolyvinylalcohol, cyanoethylcellulose, cyanoethylsucrose, carboxyl methyl cellulose, polyvinylalcohol, polyacrylic acid, polymaleic anhydride, or polyvinylpyrrolidone, for example.

BRIEF DESCRIPTION OF THE DRAWINGS

These and other features, aspects, and advantages of preferred embodiments of the present invention will be more fully described in the following detailed description, taken accompanying drawings. In the drawings:

FIGS. 1a to 1e are photographs showing a separator manufactured according to embodiments of the present invention and comparative examples, which illustrate heat shrinkage after the separator is left alone for 1 hour in an oven of 150° C.; and FIG. 2 is a photograph showing a test device for measuring a peeling force of a porous active layer formed on an organic/inorganic composite separator manufactured according to embodiments of the present invention and comparative examples.

BEST MODE

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

The present invention provides an organic/inorganic composite separator, which includes (a) a polyolefin porous substrate having pores; and (b) a porous active layer containing a mixture of inorganic particles and a binder polymer, with which at least one surface of the polyolefin porous substrate is coated, wherein the porous active layer has a peeling force of 5 gf/cm or above, and a thermal shrinkage of the separator after being left alone at 150° C. for 1 hour is 50% or below in a machine direction (MD) or in a transverse direction (TD).

In the organic/inorganic composite separator of the present invention, the porous active layer has a peeling force of 5 gf/cm or above, so the porous active layer has an excellent peeling resistance, thereby solving the problem that inorganic particles in the porous active layer are extracted while assembling a charger chemical device. In addition, an adhesive force between the porous active layer and the polyolefin porous substrate is strong. Thus, though the battery is overheated, the porous active layer and the polyolefin porous substrate are not separated, and thermal shrinkage of the polyolefin porous substrate may be restrained. That is to say, since the organic/inorganic composite separator shows a thermal shrinkage of 50% or below in a machine direction (MD) or in a transverse direction (TD), it is possible to prevent an electric short circuit between cathode and anode. In addition, though the porous substrate is overheated in the electrochemical device, both electrodes are not entirely short-circuited due to the porous active layer. Even if there occurs a short circuit, the short-circuited area is not enlarged, thereby improving stability of the electrochemical device.

In the organic/inorganic composite separator of the present invention, more preferably, the porous active layer has a peeling force of 10 gf/cm or above, and a thermal shrinkage of the separator after being left alone at 150° C. for 1 hour is preferably 30% or below in a machine direction (MD) or in a transverse direction (TD), in aspect of stability of the electrochemical device and peeling resistance of the porous active layer.

In the organic/inorganic composite separator of the present invention, the binder polymer preferably uses a mixture of a first binder polymer having a contact angle to a water drop of 70° to 140° and a second binder polymer having a contact angle to a water drop of 1° to 69°. In the present invention, after a sample film was made using a corresponding binder polymer, a distilled water drop was fallen thereon, and then a contact angle formed on the water drop was set as 23 degrees. Also, the contact angle to a water drop was measured using a contact angle measurer model CA-DT-A (mfd. produced by Kyowa Kaimen Kagaku KK) under the condition of 50% RH. Contact angles were measured at two points (namely, left and right points) of each of three sample films, and six measured values are averaged and set as a contact angle. The distilled water drop has a diameter of 2 mm, and the contact angle value displayed on the measurer shows a contact angle measured 1 minute after the distilled water drop is fallen.

Since the first and second binder polymers having different hydrophile properties are used in a blend form to control a hydrophile property of the polymer blend as mentioned above, it is possible to realize a synergistic effect in improving thermal stability of the organic/inorganic composite separator.

More preferably, the first binder polymer has a contact angle to a water drop of 90° to 110° and the second binder polymer has a contact angle to a water drop of 20° to 40°. Also, the first binder polymer and the second binder polymer are preferably mixed in a weight ratio of 95:5 to 5:95, but not limitedly.

The first binder polymer mentioned above may be any one polymer or a mixture of at least two polymers selected from the group consisting of polyvinylidene fluoride, polyvinylidene fluoride-co-hexafluoropropylene, polyvinylidene fluoride-co-trichloroethylene, polymethylmethacrylate, polyacrylonitrile, polyvinylacetate, polyethylene-co-vinyl acetate, polyimide, and polyethylene oxide, but not limitedly.

Also, the second binder polymer is preferably a polymer or a mixture of at least two polymers having at least one polar group selected from the group consisting of hydroxyl group (—OH), carboxyl group (—COOH), maleic anhydride group (—COOOC—), sulphonate group (—SO$_3$H) and pyrrolidone group (—NCO—). The second binder polymer may be cyanoethylpullulan, cyanoethylpolyvinylalcohol, cyanoethylcellulose, cyanoethylsucrose, carboxyl methyl cellulose, polyvinylalcohol, polyacrylic acid, polymaleic anhydride, or polyvinylpyrrolidone.

In addition, in the organic/inorganic composite separator according to the present invention, the number of inorganic particles per a unit area of the porous active layer is preferably $1 \times 10^{15}$ to $1 \times 10^{30}/m^2$ in consideration of a common thickness of the porous active layer. If the number of inorganic particles per a unit area of the porous active layer is less than $1 \times 10^{15}$, the thermal stability obtained by the inorganic particles may be deteriorated. Meanwhile, if the number of inorganic particles per a unit area of the porous active layer is greater than $1 \times 10^{30}/m^2$, dispersion in a coating solution and coating workability, required for forming the porous active layer, may be deteriorated. Also, a weight of the inorganic particles per a unit area of the porous active layer is preferably 5 to 100 g/m$^2$.

In the organic/inorganic composite separator according to the present invention, the inorganic particle used for forming the porous active layer is not specifically limited if it is electrically chemically stable. That is to say, an inorganic particle usable in the present invention is not specially limited if oxidation or reduction reaction does not occur in an operating voltage range (for example, 0 to 5V based on Li/Li$^+$) of an applied electrochemical device. In particular, in case an inorganic particle with ion transferring capability is used, it is possible to enhance the performance by increasing ion conductivity in the electrochemical device.

In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles are selected from the group consisting of inorganic particles having a dielectric constant of 5 or above, preferably 10 or above, inorganic particles having lithium-ion transferring capability, or their mixtures. The inorganic particle having a dielectric constant of 5 or above is any one inorganic particle or a mixture of at least two inorganic particles selected from the group consisting of BaTiO$_3$, Pb(Zr,Ti)O$_3$ (PZT), Pb$_{1-x}$La$_x$Zr$_{1-y}$Ti$_y$O$_3$ (PLZT), PB(Mg$_3$Nb$_{2/3}$)O$_3$—PbTiO$_3$ (PMN-PT), hafnia (HfO$_2$), SrTiO$_3$, SnO$_2$, CeO$_2$, MgO, NiL, CaO, ZnO, ZrO$_2$, SiO$_2$, Y$_2$O$_3$, Al$_2$O$_3$, SiC and TiO$_2$, but not limitedly.

In particular, the inorganic particles such as of BaTiO$_3$, Pb(Zr,Ti)O$_3$ (PZT), Pb$_{1-x}$La$_x$Zr$_{1-y}$Ti$_y$O$_3$ (PLZT), PB(Mg$_3$Nb$_{2/3}$)O$_3$—PbTiO$_3$ (PMN-PT) and hafnia (HfO$_2$) show a high dielectric constant of 100 or above and have piezoelectricity since charges are generated to make a potential difference between both surfaces when a certain pressure is applied to extend or shrink them, so the above inorganic particles may prevent generation of an internal short circuit of both electrodes caused by an external impact and thus further improve the stability of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. The inorganic particle having lithium ion transferring capability is any one inorganic particle or a mixture of at least two inorganic particles selected from the group consisting of lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitrides (Li$_x$N$_y$, 0<x<4, 0<y<2), SiS$_2$ (Li$_x$Si$_y$S$_z$, 0<x<3, 0<y<2, 0<z<4) type glass, and P$_2$S$_5$ (Li$_x$P$_y$S$_z$, 0<x<3, 0<y<3, 0<z<7) type glass, but not limitedly.

In the organic/inorganic composite separator according to the present invention, the size of inorganic particles in the porous active layer is not specially limited, but it is preferably in the range from 0.001 to 10 μm, if possible, in order to form a coating layer in a uniform thickness and ensure suitable porosity. If the particle size is less than 0.001 μm, a dispersing property is deteriorated, so it is not easy to control properties of the organic/inorganic composite separator. If the particle size exceeds 10 μm, the thickness of the porous active layer is increased, which may deteriorate mechanical properties. In addition, due to excessively great pore size, the possibility of internal short circuit is increased while charging or discharging a battery.

In the organic/inorganic composite separator coated with the porous active layer according to the present invention, a weight ratio of the inorganic particles and the binder polymer is in the range from 50:50 to 99:1, more preferably from 70:30 to 95:5. If the weight ratio of the organic particles to the binder polymer is less than 50:50, the content of polymer is so great that the thermal stability of the organic/inorganic composite separator may not be much improved. In addition, pore size and porosity may be decreased due to the decrease of interstitial volume formed among the inorganic particles, thereby causing deterioration of the performance of a battery. If the weight ratio exceeds 99:1, the peeling resistance of the porous active layer may be weakened since the content of binder polymer is so small. The thickness of the porous active layer composed of the inorganic particles and the binder polymer is not specially limited but preferably in the range from 0.01 to 20 μm. Also, pore size and porosity are not specially limited, but the pore size is preferably ranged from 0.001 to 10 μm and a porosity is preferably ranged from 10 to 90%. The pore size and porosity are mainly dependent on the size of inorganic particles. For example, in case inorganic particles have a diameter of 1 μm or less, the formed pore is also approximately 1 μm or less. The pores as mentioned above are filled with electrolyte later, and the filled electrolyte plays a role of transferring ions. In case the pore size and porosity are respectively less than 0.001 μm and 10%, the porous active layer may act as a resistance layer. In case the pore size and porosity are respectively greater than 10 μm and 90%, mechanical properties may be deteriorated.

The organic/inorganic composite separator according to the present invention may further include other additives as components of the active layer, in addition to the inorganic particles and the polymer.

In addition, in the organic/inorganic composite separator according to the present invention, the polyolefin porous substrate may adopt any kind of polyolefin porous substrate if it is commonly used as a separator of an electrochemical device, particularly a lithium secondary battery. For example, the polyolefin porous substrate may be a membrane formed using any one polyolefin polymer or a mixture of at least two polyolefin polymers selected from the group consisting of polyethylene, polypropylene, polybutylene and polypentene. The polyolefin porous substrate preferably has a thickness of 1 to 100 μm, though not limited thereto, and also the pore size and porosity of the porous substrate are preferably 0.01 to 50 μm and 10 to 95%, respectively, though not limited thereto.

Hereinafter, a method for manufacturing an organic/inorganic composite separator coated with a porous active layer according to the present invention is explained based on the case that a mixture of the first and second binder polymers with different contact angles to a water drop is used as an example, but the present invention is not limited thereto.

First, the first and second binder polymers with the aforementioned contact angles to a water drop are dissolved in a solvent to make a binder polymer solution.

Subsequently, inorganic particles are added to the binder polymer solution and then dispersed therein. The solvent preferably has a solubility parameter similar to that of the used binder polymer and a low boiling point. It will help uniform mixture and easy removal of the solvent afterward. A non-limiting example of usable solvent includes acetone, tetrahydrofuran, methylene chloride, chloroform, dimethylformamide, N-methyl-2-pyrrolidone (NMP), cyclohexane, water and mixtures thereof. It is preferred that the inorganic particles are pulverized after being added to the binder polymer solution. At this time, the time required for pulverization is suitably 1 to 20 hours, and the particle size of the pulverized particles ranges preferably from 0.001 and 10 μm, as mentioned above. Conventional pulverization methods may be used, and a method using a ball mill is particularly preferred.

After that, the polyolefin porous substrate is coated with the binder polymer solution in which the inorganic particles are dispersed, under the humidity condition of 10 to 80%, and then dried.

In order to coat the porous substrate with the binder polymer solution in which the inorganic particles are dispersed, a common coating method well known in the art may be used. For example, various methods such as dip coating, die coating, roll coating, comma coating or their combinations may be used. In addition, the porous active layer may be formed selectively on both surfaces or only one surface of the porous substrate.

The organic/inorganic composite separator manufactured as mentioned above may be used as a separator of an electrochemical device, preferably a lithium secondary battery. At this time, in case a gellable polymer is used as a binder polymer component when a liquid electrolyte is impregnated, after a battery is assembled using the separator, the injected electrolyte and polymer may be reacted and then gelled, thereby forming a gel-type organic/inorganic composite electrolyte.

In addition, the present invention provides an electrochemical device, which includes (a) a cathode; (b) an anode; (c) an organic/inorganic composite separator interposed between the cathode and the anode and coated with the above-mentioned porous active layer; and (d) an electrolyte.

The electrochemical device may be any device in which electrochemical reactions may occur, and a specific example of the electrochemical devices includes all kinds of primary batteries, secondary batteries, fuel cells, solar cells or capacitors. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured according to common methods well known to the art. As one embodiment of the method for manufacturing an electrochemical device, an electrochemical device may be manufactured by interposing the above-mentioned organic/inorganic composite separator between a cathode and an anode and injecting an electrolyte solution therein.

There is no special limitation in the electrodes that may be used together with an organic/inorganic composite separator of the present invention, and the electrodes may be manufactured by settling electrode active materials on a current collector according to one of common methods well known in the art. Among the electrode active materials, a non-limiting example of cathode active materials may include any conventional cathode active materials currently used in a cathode of a conventional electrochemical device. Particularly, lithium manganese oxides, lithium cobalt oxides, lithium nickel oxides, lithium iron oxides or lithium composite oxides thereof are preferred as the cathode active materials. Also, a non-limiting example of anode active materials may include any conventional anode active materials currently used in an anode of a conventional electrochemical device. Particularly, lithium intercalation materials such as lithium metal, lithium alloys, carbon, petroleum coke, activated carbon, graphite or other carbonaceous materials are preferred as the anode active materials. A non-limiting example of a cathode current collector includes a foil formed of aluminum, nickel or a combination thereof. A non-limiting example of an anode current collector includes a foil formed of copper, gold, nickel, copper alloys or a combination thereof.

The electrolyte solution that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an salt containing an anion selected from the group consisting of $PF_6^-$, $BF_4^-$, $Cl^-$, $Br_-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. The salt may be dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte solution that may be used in the present invention is not limited to the above examples.

More particularly, the electrolyte solution may be injected in a suitable step during the manufacturing process of a battery, according to the manufacturing process and desired properties of a final product. In other words, the electrolyte solution may be injected before a battery is assembled or during a final step of the assembly process of a battery.

In order to apply the organic/inorganic composite separator according to the present invention to a battery, a stacking (or, laminating) process or a folding process may be used in addition to a winding process that is most commonly used. The organic/inorganic composite separator of the present invention has an excellent peeling resistance, so the inorganic particles are not easily extracted during the battery assembly process.

MODE FOR INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

Preparation of Organic/Inorganic [(PVdF—HFP/Cyanoethylpolyvinylalcohol)/$Al_2O_3$] Composite Separator 5 weight % of polyvinylidene fluoride-co-hexafluoropropylene (PVdF-HFP, a contact angle to a water drop is 100°) and 5 weight % of cyanoethylpolyvinylalcohol (a contact angle to a water drop is 30°) were respectively added to acetone and dissolved at 50° C. for about 12 hours to make a binder polymer solution. $Al_2O_3$ powder was added to the prepared binder polymer solution at a weight ratio that polymer mixture/$Al_2O_3$=10/90, and then the $Al_2O_3$ powder was pulverized and dispersed for 12 hours or more by ball milling to make a slurry. In the prepared slurry, the diameter of $Al_2O_3$ may be controlled according to a size (or, diameter) of used beads and the time for the ball milling, but in this example 1, the $Al_2O_3$ powder was pulverized into about 400 nm to make the slurry. The prepared slurry was used for coating a polyethylene separator (having a porosity of 45%) with a thickness of 16 μm by means of dip coating, and a coating thickness was controlled to be about 4 μm on one surface of the separator. A pore size in the porous active layer formed on the polyethylene separator was in the level of 0.5 μm, and a porosity was 58%. The weight of the porous active layer was about 16 g/m² per a unit area, and the number of only inorganic particles in the porous active layer was estimated as about $5 \times 10^{19}$/m², considering the size (400 nm) and density (4.123 g/cc) of the inorganic particles.

Example 2

An organic/inorganic [(PVdF-CTFE/Cyanoethylpolyvinylalcohol)/$Al_2O_3$] composite separator was prepared in the same way as the example 1, except that polyvinylidene fluoride-co-trichloroethylene (PVdF-CTFE, a contact angle to a water drop is 95°) was used instead of PVdF-HFP.

Example 3

An organic/inorganic [(PVdF-HFP/Cyanoethylpolyvinylalcohol)/$BaTiO_3$] composite separator was prepared in the same way as the example 1, except that $BaTiO_3$ powder was used instead of $Al_2O_3$ powder. The active layer had a weight of about 22 g/m², and the number of only inorganic particles in the active layer was estimated as about $4 \times 10^{19}$/m², considering the size (400 nm) and density (5.7 g/cc) of the inorganic particles.

Comparative Example 1

A polyethylene (PE) separator not coated with a porous active layer is selected as a comparative example 1.

Comparative Example 2

An organic/inorganic [PVdF-HFP/$Al_2O_3$] composite separator was prepared in the same way as the example 1, except that cyanoethylpolyvinylalcohol is not used but a binder polymer composed of only PVdF-CTFE was used.

Comparative Example 3

An organic/inorganic [(PVdF-HFP/PVdF-CTFE)/$Al_2O_3$] composite separator was prepared in the same way as the example 1, except that PVdF-CTFE was used instead of cyanoethylpolyvinylalcohol and thus binder polymer composed of PVdF-HFP and PVdF-CTFE was used.

Comparative Example 4

An organic/inorganic [PVdF-HFP/$Al_2O_3$] composite separator was prepared in the same way as the comparative example 2, except that the content of PVdF-HFP was increased to 50 weight % (PVdF-HFP/$Al_2O_3$=50/50).

Analysis of Properties of Organic/Inorganic Composite Porous Separator

In order to measure thermal shrinkage of the separators prepared according to the examples 1 to 3 and the comparative examples 1 to 4, experiments were conducted in a way that a corresponding separator is stored in an oven heated to 150° C. for 1 hour and then taken out. As a test piece, the organic/inorganic [(PVdF--HFP/Cyanoethylpolyvinylalcohol)/$Al_2O_3$] composite separator prepared according to the example 1 was used, and the separators of the comparative examples 1 to 3 were used as a control group.

It would be understood that the separator of the example 1 shows thermal shrinkage of about 20% in both TD and MD directions, so it gives an excellent thermal shrinkage restraining effect (see FIG. 1a).

Meanwhile, the polyethylene separator of the comparative example 1, to which a coating layer is not introduced, shows extreme thermal shrinkage of about 90% (see FIG. 1b), and the separators of the comparative examples 2 and 3 show thermal shrinkage of about 60% (see FIGS. 1c and 1d), which is better than that of the comparative example 1 but still significantly high. In addition, the separator of the comparative example 4 shows a peeling resistance improved rather than that of the comparative examples 2 and 3 but shows a deteriorated thermal shrinkage restraining effect (see FIG. 1e), and its reason is guessed as the content of inorganic particles is relatively seriously lowered rather than the content of binder polymer.

Meanwhile, in order to evaluate a peeling resistance of the porous active layer with which the organic/inorganic composite separators according to the examples and the comparative examples were coated, the following test was conducted. The term 'a peeling force of a porous active layer' used herein means a peeling force measured according to the following test.

The organic/inorganic composite separators of the embodiments 1 to 3 and the comparative examples 2 to 4 were respectively firmly attached to a glass plate using a transparent double-sided tape (3M). At this time, the test piece had a width of 1.5 cm and a length of 6 to 8 cm. Subsequently, a force required for separating the porous active layer from a base film was measured using a tensile force measuring device (UTM, LLOYD LF PLUS) as shown in FIG. 2 to evaluate a peeling force of the porous active layer. Thermal shrinkages of the separator of the examples and comparative examples and peeling forces of the porous active layers, measured as mentioned above, are listed in the following table 1.

TABLE 1

| | Thermal shrinkage [%] (after 150° C./1 hour preservation) | Peeling force [gf/cm] |
|---|---|---|
| Example 1 | ~20 | 28 |
| Example 2 | ~20 | 31 |
| Example 3 | ~20 | 25 |
| Comparative example 1 | ~90 | — |
| Comparative example 2 | ~60 | 2 |
| Comparative example 3 | ~60 | 3 |
| Comparative example 4 | ~70 | 22 |

INDUSTRIAL APPLICABILITY

As described above, the organic/inorganic composite separator of the present invention prevents the problem that inorganic particles in a porous active layer are extracted during an assembling process of an electrochemical device, though the content of inorganic particles contained in the porous coating layer is sufficient over a certain level. In addition, since an adhesive force between the porous active layer and the polyolefin porous substrate is strong, thermal shrinkage of the electrochemical device is restrained though the electrochemical device is overheated, thereby preventing an electric short circuit between cathode and anode. Accoring, the stability of the electrochemical device is greatly improved.

In particular, if the porous active layer is formed using two kinds of binder polymers having predetermined contact angles to a water drop according to the preferred embodiment of the present invention, it is possible to realize a synergistic effect in improving thermal stability of the organic/inorganic composite polymer.

The invention claimed is:

1. An organic/inorganic composite separator, comprising:
    (a) a polyolefin porous substrate having pores; and
    (b) a porous active layer containing a mixture of inorganic particles and a binder polymer, with which at least one surface of the polyolefin porous substrate is coated,
    wherein the porous active layer has a peeling force of 5 gf/cm or above, and a thermal shrinkage of the separator after being left alone at 150° C. for 1 hour is 50% or below in a machine direction (MD) or in a transverse direction (TD),
    wherein the inorganic particles and the binder polymer are mixed in a weight ratio of 50:50 to 99:1.

2. The organic/inorganic composite separator according to claim 1, wherein the porous active layer has a peeling force of 10 gf/cm or above, and a thermal shrinkage of the separator after being left alone at 150° C. for 1 hour is 30% or below in a machine direction (MD) or in a transverse direction (TD).

3. The organic/inorganic composite separator according to claim 1, wherein the binder polymer is a mixture of a first binder polymer having a contact angle to a water drop of 70° to 140° and a second binder polymer having a contact angle to a water drop of 1° to 69°.

4. The organic/inorganic composite separator according to claim 3, wherein the first binder polymer has a contact angle to a water drop of 90° to 110° and the second binder polymer has a contact angle to a water drop of 20° to 40°.

5. The organic/inorganic composite separator according to claim 3, wherein the first binder polymer and the second binder polymer are mixed in a weight ratio of 95:5 to 5:95.

6. The organic/inorganic composite separator according to claim 3, wherein the first binder polymer is any one polymer or a mixture of at least two polymers selected from the group consisting of polyvinylidene fluoride, polyvinylidene fluoride-co-hexafluoropropylene, polyvinylidene fluoride-co-trichloroethylene, polymethylmethacrylate, polyacrylonitrile, polyvinylacetate, polyethylene-co-vinyl acetate, polyimide and polyethylene oxide.

7. The organic/inorganic composite separator according to claim 3, wherein the second binder polymer has at least one polar group selected from the group consisting of hydroxyl group (—OH), carboxyl group (—COOH), maleic anhydride group (—COOOC—), sulphonate group (—$SO_3H$) and pyrrolidone group (—NCO—).

8. The organic/inorganic composite separator according to claim 7, wherein the second binder polymer is any one polymer or a mixture of at least two polymers selected from the group consisting of cyanoethylpullulan, cyanoethylpolyvinylalcohol, cyanoethylcellulose, cyanoethylsucrose, carboxyl methyl cellulose, polyvinylalcohol, polyacrylic acid, polymaleic anhydride and polyvinylpyrrolidone.

9. The organic/inorganic composite separator according to claim 1, wherein the number of inorganic particles per a unit area of the porous active layer is $1 \times 10^{15}$ to $1 \times 10^{30}/m^2$.

10. The organic/inorganic composite separator according to claim 1, wherein a weight of the inorganic particles per a unit area of the porous active layer is 5 to 100 $g/m^2$.

11. The organic/inorganic composite separator according to claim 1, wherein a size of the inorganic particles is 0.001 to 10 μm.

12. The organic/inorganic composite separator according to claim 1, wherein the inorganic particles are selected from the group consisting of inorganic particles having a dielectric constant of 5 or above, inorganic particles having lithium-ion conductivity, or their mixtures.

13. The organic/inorganic composite separator according to claim 12, wherein the inorganic particle having a dielectric constant of 5 or above is any one inorganic particle or a mixture of at least two inorganic particles selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$.

14. The organic/inorganic composite separator according to claim 13, wherein the inorganic particle having a dielectric constant of 5 or above is any one piezoelectric inorganic particle or a mixture of at least two piezoelectric inorganic particles selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$).

15. The organic/inorganic composite separator according to claim 12, wherein the inorganic particles having lithium-ion conductivity is any one inorganic particle or a mixture of at least two inorganic particles selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ ($Li_xSi_yS_z$, $0<x<3$, $0<y<2$, $0<z<4$) type glass, and $P_2S_5$ ($Li_xP_yS_z$, $0<x<3$, $0<y<3$, $0<z<7$) type glass.

16. The organic/inorganic composite separator according to claim 1, wherein the porous active layer has a thickness of 0.01 to 20 μm, a pore size of 0.001 to 10 μm and a porosity of 10 to 90%.

17. The organic/inorganic composite separator according to claim 1, wherein the polyolefin porous substrate has a thickness of 1 to 100 μm, a pore size of 0.01 to 50 μm and a porosity of 10 to 95%.

18. The organic/inorganic composite separator according to claim 1, wherein the polyolefin porous substrate is formed using any one polymer or a mixture of at least two polymers selected from the group consisting of polyethylene, polypropylene, polybutylene and polypentene.

19. An electrochemical device including a cathode, an anode, a separator and an electrolyte,
wherein the separator is the organic/inorganic composite separator defined in claim 1.

20. The electrochemical device according to claim 19, wherein the electrochemical device is a lithium secondary battery.

* * * * *